(12) United States Patent
Zbiciak

(10) Patent No.: US 6,819,684 B1
(45) Date of Patent: Nov. 16, 2004

(54) DETERMINISTIC BIT INSERTION INTO SERIAL COMMUNICATIONS

(75) Inventor: Joseph R. Zbiciak, North Richland Hills, TX (US)

(73) Assignee: Texas Instruments Incorporated, Dallas, TX (US)

(*) Notice: Subject to any disclaimer, the term of this patent is extended or adjusted under 35 U.S.C. 154(b) by 979 days.

(21) Appl. No.: 09/713,737

(22) Filed: Nov. 15, 2000

Related U.S. Application Data

(60) Provisional application No. 60/172,336, filed on Dec. 17, 1999.

(51) Int. Cl.[7] .................................................. H04J 3/06
(52) U.S. Cl. ....................................... 370/509; 375/365
(58) Field of Search ................................ 370/514, 503, 370/509, 512, 513, 523; 375/354, 363, 365, 368; 714/766, 775, 789

(56) References Cited

U.S. PATENT DOCUMENTS

| | | | | |
|---|---|---|---|---|
| 5,119,478 A | | 6/1992 | Calvignac et al. ......... 395/200 |
| 5,465,345 A | | 11/1995 | Blanc et al. ................ 395/200 |
| 5,557,615 A | * | 9/1996 | Fox ............................ 370/514 |
| 5,943,374 A | * | 8/1999 | Kokuryo et al. ............ 375/354 |
| 6,104,730 A | * | 8/2000 | Marks ........................ 370/523 |
| 6,377,645 B1 | * | 4/2002 | Chen et al. ................. 375/372 |
| 6,782,066 B1 | * | 8/2004 | Nicholas et al. ........... 375/368 |
| 6,785,299 B1 | * | 8/2004 | March ........................ 370/506 |

* cited by examiner

Primary Examiner—Andy Lee
(74) Attorney, Agent, or Firm—Robert D. Marshall, Jr.; W. James Brady, III; Frederick J. Telecky, Jr.

(57) ABSTRACT

A data communications subsystem (15) including a digital signal processor (DSP) (20) for performing bit insertion to preclude the inadvertent serial transmission of a protocol flag sequence is disclosed. A trigger sequence detection process (40) applies an infinite impulse response (IIR) filter to a current sequence of the input bitstream to generate a insertion bitstream that is bit sychronized with the the input bitstream. A bit insertion process (50) then inserts bits into the input bitstream at bit positions indicated by the insertion bitstream. The trigger sequence detection process (40) may be applied to subsequent sections of the input bitstream, as it is not dependent upon the results of the bit insertion process (50).

18 Claims, 3 Drawing Sheets

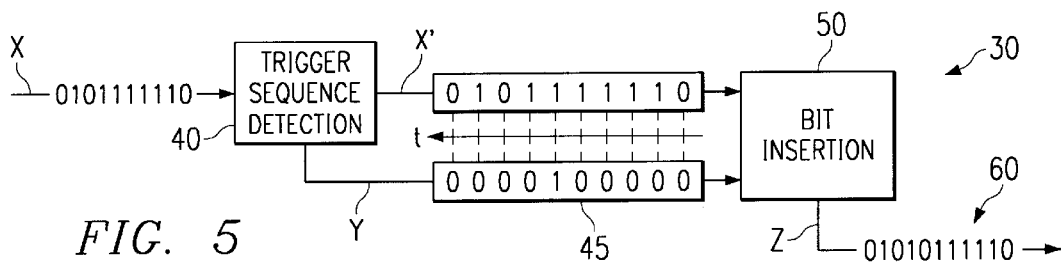
FIG. 5
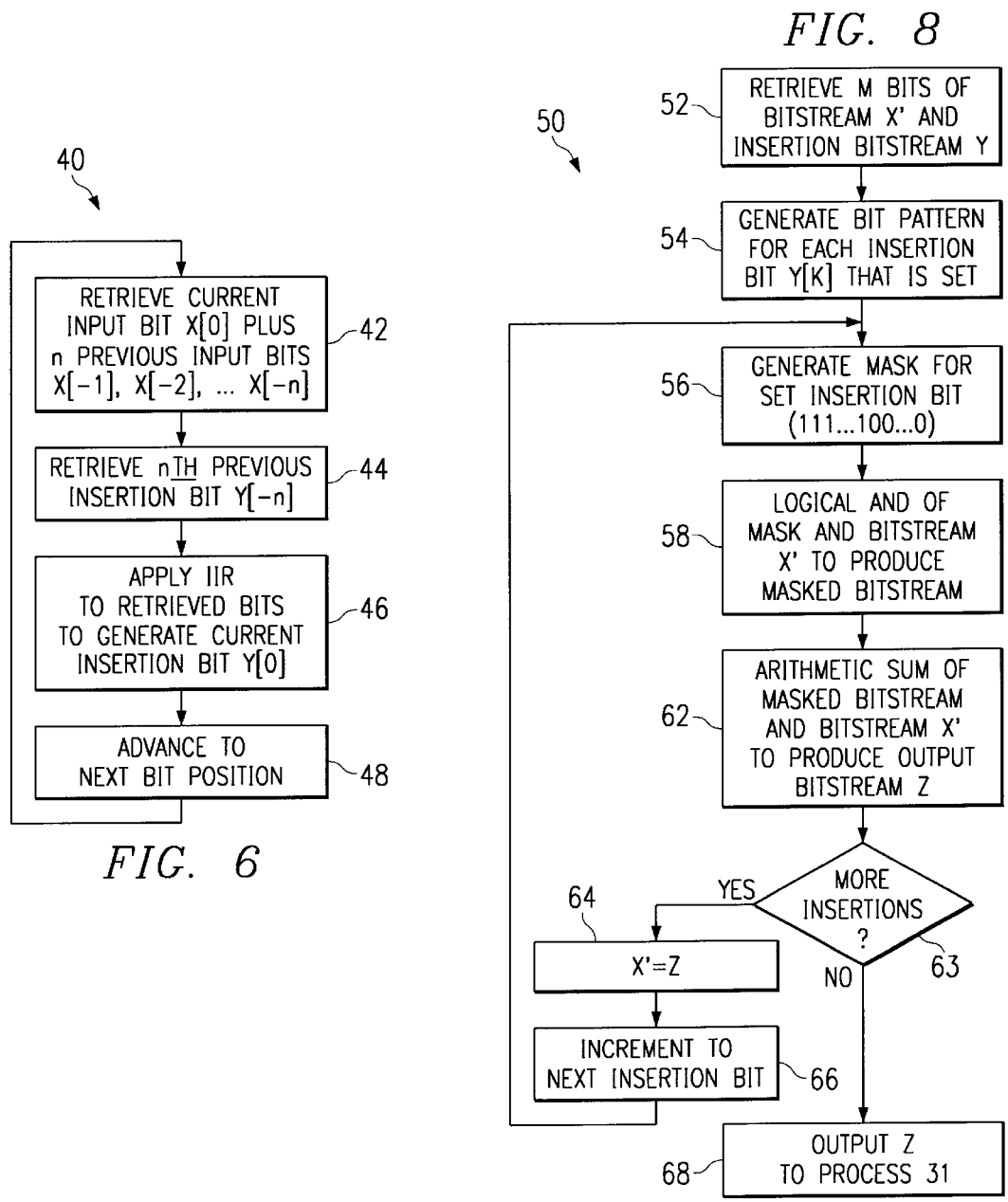
FIG. 6
FIG. 8

DETERMINISTIC BIT INSERTION INTO SERIAL COMMUNICATIONS

This application claims priority under 35 USC §119(e)(1) of Provisional Application No. 60/172,336, filed Dec. 17, 1999.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data communications, and is more specifically directed to coding techniques useful in serial data communication.

Data communication among computers has become widespread over recent years, connecting computer users and their applications to remote sources of data. Such communication may be relatively local, such as among computers in a small office over a local area network (LAN) among computers, within an enterprise but at different locations over a private wide area network (WAN) or "intranet", among computers over the worldwide and public medium commonly referred to as the Internet. Additionally, in recent years, data communication among computers over wireless networks has become available, and is rapidly increasing in popularity.

Recent improvements in the data communication technology have provided huge increases in the bandwidth of the data communicated which in combination with the widespread coverage of the interconnected computers, has enabled new applications for computers and work stations. For example, data communications among computers are now of sufficient bandwidth to now enable the transmittal and receipt of multimedia signal, including audio and full-motion video. It is contemplated that these applications will become even more popular with the continuing widespread deployment of high speed networks, both public and private.

Typically, a large portion of the overall data communicated worldwide is communicated by way of a serial link. In a serial link, the data communication message is transmitted one bit at a time, in a bitstream, over a (wire or wireless) conductor between the source and the destination. Such serial communication may be synchronous, in which some form of clock is provided in connection with the communicated bitstream data either on a separate conductor or within the bitstream itself; the clock permits the receiver to sample the incoming bitstream at the appropriate points in time, so that the message communicated by the bitstream may be properly decoded. Asynchronous serial links are also known in the art, by way of which a series of bits in the bitstream following a "start bit" are decoded according to a presumed line speed.

Of course, communication between any selected pair of end stations may involve many computers and data processing systems therebetween, particularly in the case of Internet communications. Over recent years, various standards have developed for such communications to effect communications among computers that were previously unconnected with one another. It is contemplated that any given message may be formatted and reformatted several times among various standard formats in its travels from its source to its destination. In each case, the formatting for transmission and receipt will generally involve coding according to a particular standard that has been selected for good communications performances both in accuracy and speed, over the particular leg of the network.

Many serial data communications standards have been promulgated to ensure compatibility of the numerous transmitting computers. According to many standards, the communications are packet-based, in that the transmitted bits and bytes of data are grouped into packets of data, which may be either of a fixed length (such as Asynchronous Transfer Mode, or ATM, communications) or of a variable length. Packet data communications permits error detection techniques to be applied, so that those packets that have been distorted in transmission to the extent of having one or more bit errors can be identified, and retransmitted if necessary. Each packet of data in a bitstream is typically delimited by known sequences that indicate the beginnings and ends of a given packet, so that the receiving computer can extract the data contained within the packet, and perform the appropriate error detection routines and other appropriate processing thereupon.

One well-known protocol for packet-based serial communications is referred to as High-level Data Link Control, or HDLC. According to this standard, each frame of communicated data includes start and end "flags", also referred to as opening and closing flags, in the bitstream that delimit a packet within the communicated bitstream. In the HDLC protocol, the start and end flags are identical, and are represented by a sequence of six "1" bits surrounded by "0" bits, or 01111110. FIG. 1 illustrates the arrangement of an HDLC frame. As shown therein, opening flag 2 and closing flag 12 are represented by the bit sequence 01111110. Following opening flag 2, address 4 indicates the Internet Protocol (IP) address that is to receive the communication, and control portion 6 includes the appropriate control bits associated with the frame. Following the actual data payload 8, a frame check sequence 10 is provided for verification of the data integrity by way of a cyclic redundant check (CRC) operation. The closing flag 12 then follows.

It is of course apparent from the foregoing that the communicated frame must not include a sequence of six "1" bits in succession at any point during the non-flag portions, as such an inadvertent sequence would be incorrectly interpreted as closing flag 12. In particular, address and control portions 4, 6 can be specified so as not to include this sequence, but data and FCS portions 8, 10 depend upon the message being transmitted and thus may include any particular sequence of bits as determined by the message itself. As a result, in the formatting of an HDLC frame, the transmitting network element must review the bitstream to be transmitted and insert a "0" after each sequence of five "1" bits in order to avoid an inadvertent flag. On the receiving end, the receiving network element can readily remove the inserted "0" bits by removing each "0" that appears after a sequence of five "1" bits. Of course, if the receiving network element sees a "1" after a sequence of five "1" bits, the sixth "1" indicates the presence of opening flag 2 or closing flag 12.

Many conventional approaches are known for bit insertion into HDLC and similar protocols for this reason. FIG. 2 illustrates, at a high level, a typical bit insertion approach, in which bit insertion circuit and buffer 14 receives an input bitstream IN and produces an output bitstream OUT, for transmission over the communications network. Bit insertion circuit and buffer 14 in this conventional approach first analyzes the front of the input bitstream IN by determining whether the particular pattern after which a bit is to be inserted appears thereat; in the HDLC example, the trigger pattern corresponds to the sequence 011111, where the leading "0" is either pre-existing in the data pattern or has been inserted as the result of detecting a previous contiguous trigger pattern. If not, a portion of the input bitstream is advanced to the output bitstream OUT. If, however, the trigger pattern is found, bit insertion circuit and buffer 14 inserts the desired bit (e.g., "0"), and then advances the bitstream by the corresponding number of bits according to the pattern that was matched.

It has been observed, according to the present invention, that this conventional approach is not particularly efficient. First, the bit insertion process is serial, in that identification of a second trigger pattern cannot begin until after the bit insertion process is complete for the previously detected trigger pattern. As a result, this conventional approach can be quite slow in its operation, and the processing time is necessarily dependent on the data being processed. Secondly, the number of bits that are advanced from bit insertion circuit and buffer 14 to output bitstream OUT will vary in a data-dependent manner, and can vary quite widely. Such operation requires relatively complex circuitry to implement the bit insertion function, considering the wide range in the number of bits to be examined, and also requires the downstream elements to expect data at rates that vary widely, and in a non-deterministic fashion.

By way of further background, other bit insertion techniques are also known in the art. One example is described in U.S. Pat. No. 5,119,478, in which each byte of the transmitted data is examined by way of specific logic circuitry (as shown in its FIG. 12) to generate logic signals corresponding to the potential insertion of zero bits; these logic signals are then applied to updating logic (as shown in its FIG. 13) which, after the application of additional logic circuitry, generates logic signal is that are applied to a coder that determines the number of "0" bits to be inserted in connection with the examined byte in transmission. U.S. Pat. No. 5,465,345 describes a bit insertion technique that relies upon a table lookup approach, in which a table is accessed according to values of certain counters pertaining to the number of consecutive "1" bits, to produce a data word from which the data frame is then built.

BRIEF SUMMARY OF THE INVENTION

It is therefore an object of the present invention to provide a method and circuitry for serial transmission in which the processing time required is deterministic, and not data dependent.

It is a further object of the present invention to provide such a method and circuitry in which a constant rate of output bit forwarding may be achieved.

It is a further object of the present invention to provide such a method and circuitry in which identification of later instances of the bit insertion trigger pattern may take place without waiting for bit insertion for previous instances.

It is a further object of the present invention to provide such a method and circuitry that may be easily adapted to perform bit insertion over a wide range of protocols.

Other objects and advantages of the present invention will be apparent to those of ordinary skill in the art having reference to the following specification together with its drawings.

The present invention may be implemented into a serial transmission circuit, such as an instruction-programmable integrated circuit, in which an infinite impulse response (IIR) digital filter is applied to the data bitstream to detect sequences therein that require a bit to be inserted. The output of the IIR digital filter is an insertion bitstream having a bit associated with each bit of the data bitstream, and indicating the positions of those bits after which a bit is to be inserted. A downstream function analyzes the insertion bitstream, and modifies the transmission bitstream to insert bits of a desired state at the indicated locations.

BRIEF DESCRIPTION OF THE SEVERAL VIEWS OF THE DRAWING

FIG. 5 is a flow diagram illustrating the operations in the bit insertion process of the communications performed in the flow of FIG. 4, according to the preferred embodiment of the invention.

FIG. 6 is a flow diagram illustrating the operation of trigger sequence detection in the bit insertion process illustrated in FIG. 5, according to the preferred embodiment of the invention.

FIG. 8 is a flow diagram illustrating the bit insertion portion of the process of FIG. 5, according to the preferred embodiment of the invention.

DETAILED DESCRIPTION OF THE INVENTION

As will be apparent to those skilled in the art, the present invention may be used in connection with a wide range of data communications applications and systems. Examples of such communications systems include modems, network interfaces, wireless communications systems, and intermediate network systems such as routers, bridges, and switches. Additionally, the present invention may be used in connection with a wide range of communications protocols in which bit insertion is used, examples of which include High-Level Data Link Control (HDLC), Serial Data Link Control (SDLC), and the like. It will therefore be understood that the description of the preferred embodiment of the invention provided herein is by way of example only, with such other alternative implementations and applications also being within the scope of the invention as hereinafter claimed.

Figure 3:
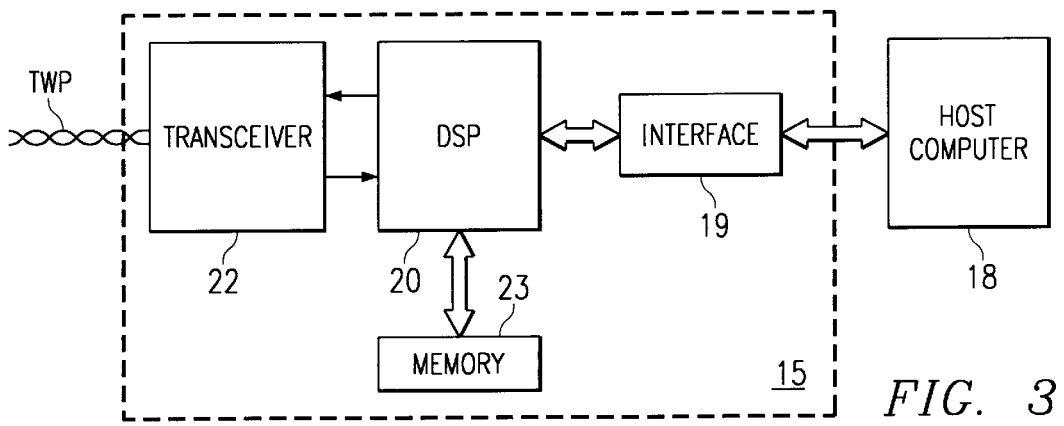
FIG. 3 is an electrical diagram, in block form, of communication circuitry for performing bit insertion and transmission according to the preferred embodiment of the invention.

Attention is now directed to FIG. 3, which illustrates communications subsystem 15 into which the preferred embodiment of the invention is implemented. Subsystem 15 may correspond to any one of a number of types of communications systems, including a modem, such as of the conventional dial-up type or operable according to Digital Subscriber Line (DSL) technology, a cable modem, a network interface card or the like. Subsystem 15 according to this embodiment of the invention is a subsystem of host computer 18, which may be a conventional personal computer or workstation. Alternatively, host computer 18 may correspond to a central office switching apparatus, a mainframe computer or server, or other similar high-level processing apparatus. As shown in FIG. 3, subsystem 15 includes host interface 19, which is a digital interface for receiving digital data from, and applying digital data to, host computer 18. Host interface 19 is coupled to digital signal processor (DSP) 20 which, according to this preferred embodiment of the invention, is an instruction-programmable integrated circuit for performing the appropriate coding of data received from host computer 18 for transmission to the communications network; conversely, DSP 20 also performs the necessary decoding processes necessary in the receipt of data from the communications network and its forwarding to host computer 18.

Subsystem 15 further includes transceiver 22, which receives data to be transmitted from DSP 20 and drives the corresponding signals onto the communications medium for transmission to the communications network; in this example, the communications medium is twisted-pair wire facility TWP, such as used in conventional modem (dial-up or DSL) communications. Of course, transceiver 22 also receives signals from the communications network over facility TWP, and converts these signals into the appropriate digital form for decoding and processing by DSP 20. The construction and realization of transceiver 22 will depend upon the particular communications being carried out by subsystem 15. For the example of modem communications, transceiver 22 will include line drivers that are directly connected with facility TWP, analog-to-digital and digital-to-analog converters for the receive and transmit functions, respectively, as well as coder/decoder ("codec") circuitry.

DSP 20, as noted above, is an instruction-programmable device for performing various coding and decoding operations; the coding operations include a bit insertion process according the preferred embodiment of the invention as will be described hereinbelow. It is contemplated that any instruction-programmable device of modern performance levels may be used as DSP 20, such devices including general purpose microprocessors, but the use of a digital signal processor device, or DSP, is preferred because its application-specific construction is particularly well-suited for the operations required in subsystem 15 and described herein. A preferred example of a DSP suitable for use as DSP 20 in connection with the present invention are those of the TMS320C5x and TMS320C6x families of digital signal processors available from Texas Instruments Incorporated. In this example, DSP 20 is bidirectionally coupled to memory 23, which includes random-access read/write memory for the storing of data involved in such coding and decoding; additionally, memory 23 may include read-only memory for storing the instruction codes that control its operation, for example in the form of firmware. DSP 20 itself may include all or a portion of memory 23 within the same integrated circuit as its logic circuitry, or memory 23 may correspond to off hip memory.

Figure 4:
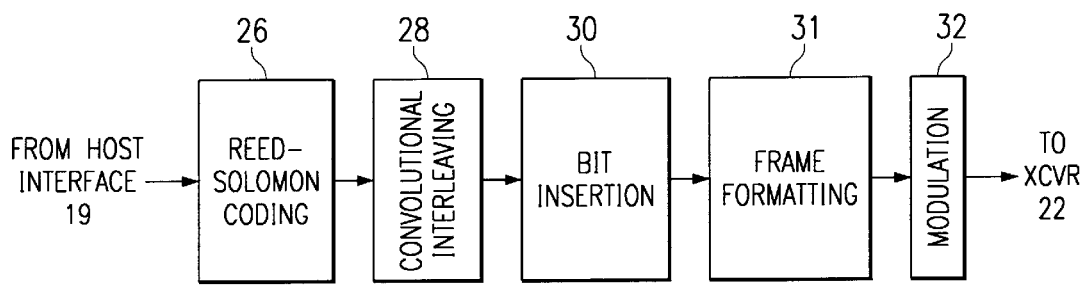
FIG. 4 is a flow diagram illustrating processes carried out by a digital signal processor in the communication circuitry of FIG. 3, according to the preferred embodiment of the invention.

Referring now to FIG. 4, an exemplary processing flow executed by DSP 20 in the coding of data to be transmitted will now be described. This process flow is presented in a somewhat generic fashion to illustrate an example of the point in the data encoding flow at which the bit insertion process according to the preferred embodiment of the invention may preferably be performed. As shown in the example of FIG. 4, DSP 20 of subsystem 15 receives digital data from host computer 18 over interface 19 and then performs Reed-Solomon coding process 26 upon this data to provide the capability for error detection and correction upon receipt. In this example, convolutional interleaving process 28 is then performed to temporally separate message blocks of data from one another when transmitted, so that a burst error event does not degrade a contiguous block of the message to such an extent that Reed-Solomon decoding is unable to correct the errors. Of course, processes 26, 28 are illustrated herein by way of example; other digital processes such as speech coding, encryption, and the like may also be performed by DSP 20 upon the digital data received from host computer 18.

Following convolutional interleaving process 28, DSP 20 next performs bit insertion process 30 according to this preferred embodiment of the invention. Bit insertion process 30, in general, analyzes the data bitstream in the time-ordered sequence in which it will be transmitted, to identify sequences that are potentially "prohibited" according to the transmission protocol to be used; bit insertion process 30 then inserts bit into the data bitstream so that the prohibited sequences are not transmitted. This preferred embodiment of the invention will be described in connection with the Highlevel Data Link Control (HDLC) protocol, in which opening and closing flags of a frame are identified by the bit sequence 01111110, as discussed above. The sequence of six "1" bits is thus a prohibited sequence, and must not appear within the data payload because it would be interpreted, on receipt, as a closing flag for the packet. According to the preferred embodiment of the invention, bit insertion process 30 inserts a "0" after each detected instance of five "1" bits, so that the prohibited sequence of six "1" bits in succession is not transmitted except as the actual frame flags.

Referring now to FIG. 6, bit insertion process 30, as performed by DSP 20 according to the preferred embodiment of the invention, will now be described in detail. As shown therein, an input bitstream x is applied to trigger sequence detection process 40 from previous processing. According to this embodiment of the invention, trigger sequence detection process 40 outputs bitstream x', which is simply a copy of input bitstream x in the same sequential order as received, and also generates insertion bitstream y, which is a sequence of bits that are in a one-to-one association with bits in bitstream x'. The one-to-one association of bits in insertion bitstream y with bitstream x' is maintained so that each bit of bitstream x' as output by trigger sequence detection process 40 and as received by bit insertion process 50 is associated with a corresponding bit of insertion bitstream y. Insertion bitstream y indicates, with a "1" value, the location at which bits are to be inserted by bit insertion process 50 into output bitstream z; specifically, with reference to the exemplary implementation of the present invention in connection with HDLC, those bit locations in insertion bitstream y having a "1" value indicate the bit in bitstream x' after which a "0" bit is to be inserted by bit insertion process 50.

FIG. 5 illustrates an example of the results of processes 40, 50. In the example of FIG. 5, a bitstream of 0111111010 is applied to trigger sequence detection process 40 (the representation of this bitstream is reversed, in FIG. 5, according to the time sequence of the bits). Trigger sequence detection process 40, in this example, is examining input bitstream x to detect the occurrence of five "1" bits in succession, after which a "0" is to be inserted so as not to inadvertently generate a sequence that would be misinterpreted as an HDLC flag. As shown in FIG. 5, this very same bitstream sequence is propagated through trigger sequence detection process 40 as bitstream x', in combination with insertion bitstream y of all zeroes except for "1" bit 45 that indicates that a "0" is to be inserted after the fifth "1" bit in bitstream x'. These bitstreams x' and y are applied to bit insertion process 50, which inserts "0" bit 60 into its output bitstream z at the location indicated by insertion bitstream y, which is immediately after the sequence of five "1" bits. The remainder of bitstream z after inserted bit 60 is the same as present in bitstreams x, x'.

As evident from the description of FIG. 5, trigger sequence detection process 40 and bit insertion process 50 are independent from one another. This separation permits the execution of processes 40, 50 by DSP 20 in parallel with one another, on different portions of the bitstreams. This parallel operation is enabled by the synchronization of bitstream x' with insertion bitstream y that includes all information necessary for bit insertion process 50 to accomplish its process. In this manner, as will become apparent from its detailed description hereinbelow, trigger sequence detection process 40 may continue to examine input bitstream x for the trigger sequence without waiting for bit insertion process 50 to insert the desired bit into a previously detected trigger location of the output bitstream z.

Referring now to FIG. 6, trigger sequence detection process 40 according to the preferred embodiment of the present invention will now be described in detail. It is contemplated, as noted above, that modern available versions of DSP 20 will be readily capable of performing the processes described herein relative to trigger sequence detection process 40. As shown in FIG. 6, trigger sequence detection process 40 is a repetitive process, performed relative to each bit position of bitstream x received from previous processes. In this regard, trigger sequence detection process 40 may be performed by DSP 20 loading blocks of bits from bitstream x, for repetitive processing within the block (saving context bits in advance of the loaded block), rather than bit-by-bit in a real-time sense. For example, a block of thirty-two bits may be loaded by DSP 20 for processing with process 30 at a time, for example where DSP 20 operates according to a thirty-two bit data word. In any event, it is contemplated that those skilled in the art having reference to this specification will be readily able to implement trigger sequence detection process 40 into the appropriate instruction code.

Trigger sequence detection process 40 begins, for a given bit position in input bitstream x, with process 42, in which the current input bit x[0] and n previous bits x[−1], x[−2], . . . , x[−n] of input bitstream x are retrieved, for example from memory 23. In process 44, DSP 20 retrieves the nth previous bit y[−n] from insertion bitstream y. As will be apparent from the following description, trigger sequence detection process 40 examines not only the current sequence of input bits x[0] through x[−n], but also the bit of insertion bitstream y corresponding to the nth previous bit.

DSP 20 next performs process 46 to execute an infinite impulse response (IIR) digital filter upon the bits retrieved in processes 42, 44, to generate the current insertion bit y[0] that is to be associated with input bit x[0] (and thus with bit x'[0] that is passed on to bit insertion process 50). This IIR filter combines the bit insertion result from a previous input bit along with a current sequence of bits to derive the proper bit insertion value, in a manner that corresponds to the actual trigger sequence and to the appropriate insertion bit indicator for the particular protocol.

Figure 7A:
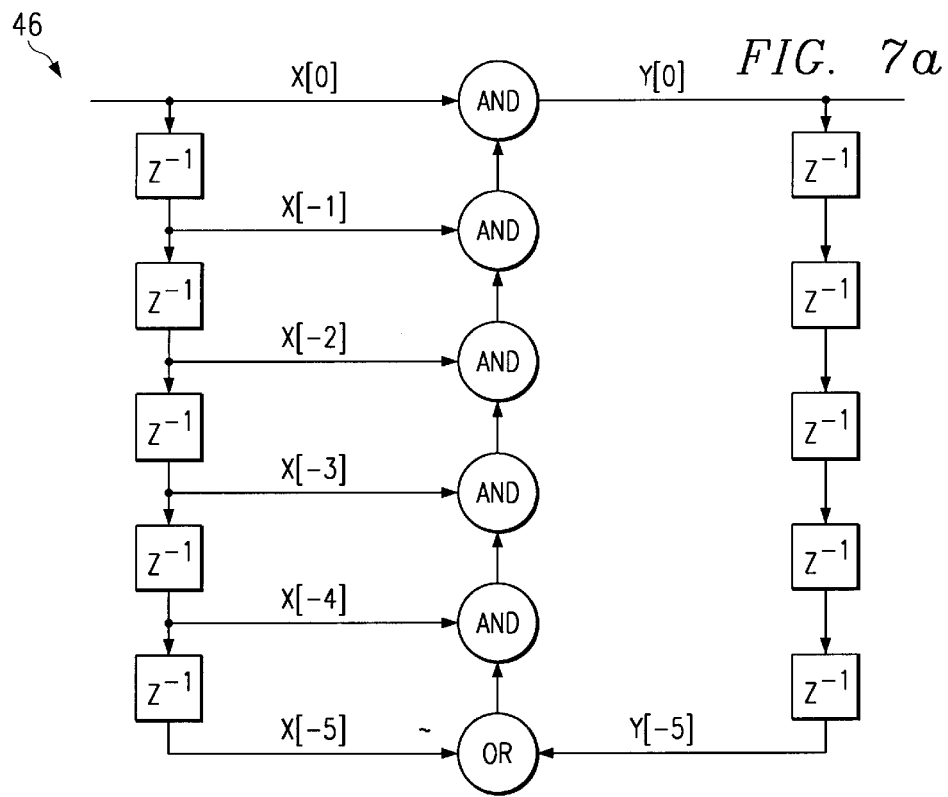
FIGS. 7a and 7b are digital filter representations illustrating infinite impulse response (IIR) filters for trigger sequence detection in the process of FIG. 6, according to the preferred embodiment of the invention.

FIG. 7a illustrates IIR process 46 for the example of HDLC protocol, in which the trigger sequence corresponds to 11111, and in which the insertion bit corresponds to a "1". In this embodiment of the invention, an insertion bit y[0]=1 is to be generated in response to a sequence of five "1" bits in the current and four most recent bit positions x[0] through x[−4], in combination with either a "0" in the fifth most recent bit x[−5] of the input bitstream or a "1" in the fifth most recent bit y[−5] of the insertion bitstream. The use of the fifth most recent bits in the input and insertion bitstreams is necessary to unambiguously insert the bit only in groups of five "1" bits in the input bitstream. A "0" in bit x[−5] indicates that the sequence of 11111 in the current and four most recent input bits is exactly the trigger sequence, while a "1" in insertion bit y[−5] indicates that the current sequence of 11111 is a valid trigger sequence that is contiguous with a previously detected trigger sequence. The IIR of FIG. 7a and process 46 according to this preferred embodiment of the invention, as applied to HDLC, thus corresponds to the equation:

$$y[0]=x[0]\cdot x[-1]\cdot x[-2]\cdot x[-3]\cdot x[-4]\cdot(\sim x[-5]+y[-5])$$

where · corresponds to a logical AND, + corresponds to a logical OR, and ~ corresponds to logical inversion (i.e., ~x[−5]=NOT x[−5]). FIG. 7a illustrates this IIR in a digital filter and z-transform representation.

According to process 46 as shown in FIG. 7a, for the HDLC case, an input bitstream x of fifteen "1" bits surrounded by "0" bits:

0111 1111 1111 1111 0 would produce the following insertion bitstream y:

0000 0100 0010 0001 0

As evident from a comparison of the above two bitstreams x, y, the insertion bits "1" are present at bit positions corresponding to the fifth, tenth, and fifteenth, consecutive "1" bits.

Figure 7B:
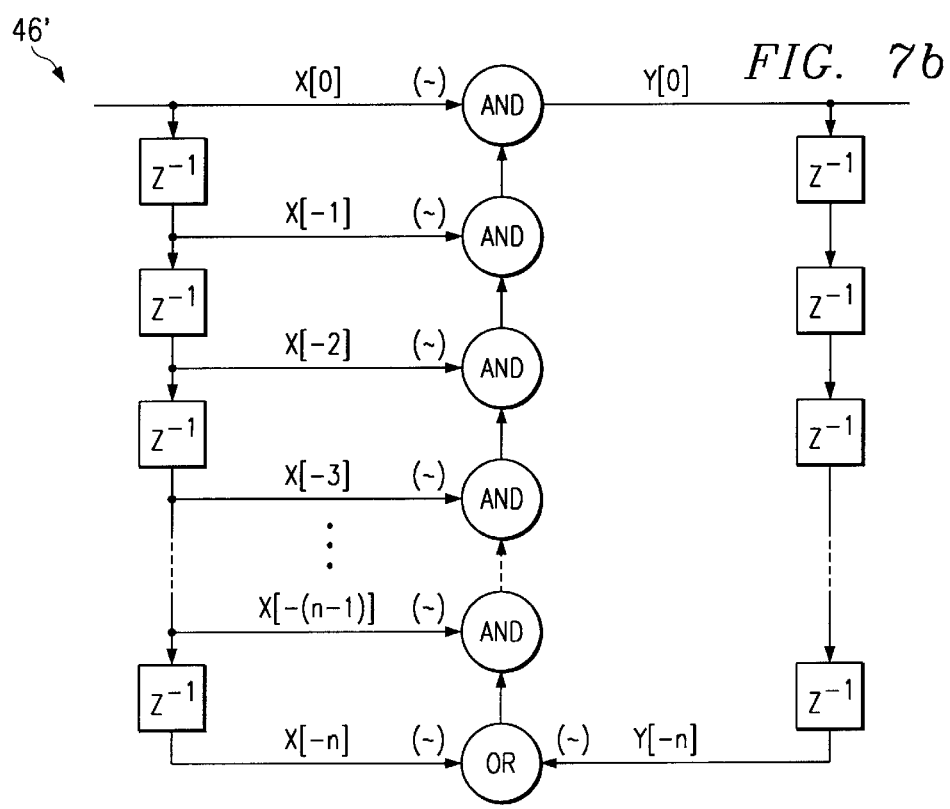

FIG. 7b illustrates the form of IIR process 46' that may be used in the general case, such as may be encountered in other communications protocols. As evident from FIG. 7b, process 46' may generally be represented as the logical, or Boolean, combination of the bitwise logical AND of a sequence of the current bit x[0] and each of the previous n−1 bits of input bitstream x, with the trigger sequence values programmed in each position by selective inversion indicated by the (~); this sequence is logically ANDed with the logical OR of an expected input bit x[−n] and the corresponding bit insertion value y[−n], each at a selected value as indicated by the (~. As such, IIR process 46' may be readily adapted to correspond to a particular trigger sequence for protocols other than HDLC. Such adaption may be simply carried out by modification of the instruction code by way of which the IIR filter is defined in DSP 20.

Referring back to FIG. 6, following the generation of the current insertion bit y[0] in process 46, DSP 20 advances to the next bit position in process 48, and then repeats trigger sequence detection process 40 from process 42 for the next bit position. This repeated trigger detection continues for each bit position in the received input bitstream x.

As evident from FIG. 5, bitstream x' and insertion bitstream y are meanwhile forwarded to bit insertion process 50, with the positions of corresponding bits in bitstreams x', y maintained in synchronous fashion. Bit insertion process 50 then inserts the desired bit, which in the HDLC case is a "0", at the locations indicated by the "1" indication in insertion bitstream y according to this embodiment of the invention. According to the present invention, however, bit insertion process 50 may operate upon a sequence of bits forwarded thereto from process 40, during the same time as process 40 is operating to detect trigger sequences in a next group of bits of the bitstream. In other words, process 40 is not required to wait until bit insertion process 50 is complete to continue trigger sequence detection, because trigger sequence detection process 40 does not depend upon the results of bit insertion process 50 according to the present invention.

Referring now to FIG. 8, a preferred method for accomplishing bit insertion process 50 according to the present embodiment of the invention will now be described in detail. It is contemplated that various techniques for performing bit insertion process 50 based upon the receipt of bitstream x' and insertion bitstream y will be apparent to those skilled in the art having reference to this specification. However, it is contemplated that the preferred approach to process 50 described herein is particularly efficient for execution by DSP 20 or another instruction-programmable device.

Process 50 begins with process 52, in which DSP 20 retrieves a selected number m of bits of bitstream x' and insertion bitstream y. The number m for such retrieval in process 52 will typically depend upon the data word size upon which DSP 20 may operate, considering the number of bits that may be inserted thereinto. For example, if DSP 20 operates upon thirty-two bit data words according to the HDLC protocol, a preferred value of m is twenty-four, considering that at most five bits will be inserted into a twenty-four bit portion of bitstream x', resulting in at most a twenty-nine bit output, which is well within the thirty-two bit data word size of DSP 20.

In process 54, DSP 20 next generates a bit pattern to indicate the position of each insertion bit that is set within the retrieved portion of insertion bitstream y. According to the preferred embodiment of the invention, each set insertion bit y[k] has a bit pattern associated therewith, through the operation of process 54. For example, consider a twenty-four bit input bitstream x[0:23], which is passed through trigger sequence detection sequence 40 as bitstream x'[0:23], as follows:

x[0:23]=x'[0:23]=1001 1111 1010 0111 1110 1010

This bitstream will produce a corresponding twenty-four bits of insertion bitstream y, also retrieved in process 52, as follows:

y[0:23]=0000 0001 0000 0000 0100 0000 within which two insertion bits y[7] and y[17] are set. In this example, process 54 will generate two bit patterns:

0000 0001 0000 0000 0000 0000 for y[7]

0000 0000 0000 0000 0100 0000 for y[17]

one for each of the insertion bits y[7], y[17] in this example. As such, each bit pattern generated in process 54 includes a single set bit, at the position therein corresponding to the set insertion bit corresponding thereto. The generation of these bit patterns may be carried out by way of relatively simple logical operations, as will be apparent to those skilled in the art having reference to this specification. For example, in the case of the HDLC protocol, a mask pattern may be repeatedly applied in a shifting manner to pass five-bit segments of the insertion bitstream y retrieved in process 52 (based on the knowledge that no group of five bits will have two set insertion bits); a logical AND of the bits resulting from the application of the shifted results will indicate which of the resulting data words includes a "1" bit and qualify as a bit pattern generated by this process 54.

Process 56 next generates a mask for the first set insertion bit in the retrieved portion of insertion bitstream y, based on the bit patterns generated in process 54. According to this preferred embodiment of the invention, the mask corresponds to a sequence of "1" bits extending from the most significant bit until the bit location of the set insertion bit, with all remaining bits set to "0". In the above example, the following bit pattern was generated in process 54 for insertion bit y[7]:

0000 0001 0000 0000 0000 0000

The mask generated in process 56 for this bit pattern is:

1111 1111 0000 0000 0000 0000

As shown in FIG. 8, this instance of process 56 is performed in connection with only one of the bit patterns from process 54, beginning with the first (left-most) set insertion bit.

In process 58, DSP 20 next applies the mask generated in process 56 to the corresponding retrieved portion of bitstream x' to produce a masked bitstream portion; this application is performed by a bitwise logical AND of these two bit sequences.

According to the above-noted example, the logical AND performed in process 58, for a first mask MASK(1) corresponding to insertion bit y[7], operates as follows:

x'[0:23]=1001 1111 1010 0111 1110 1010

MASK(1)=1111 1111 0000 0000 0000 0000 x'[0:23]·MASK(1)=1001 1111 0000 0000 0000 0000

Accordingly, the actual bits of bitstream x' beginning from bit position [0] to the bit position [7] at which the insertion bitstream y has its first set bit are passed by process 58, with all other bits zeroed.

Following the logical AND of process 58, DSP 20 next performs process 62 to produce output bitstream z with the inserted zero. According to this preferred embodiment of the invention, process 62 is performed by way of arithmetic sum of the result of process 58 with the original bitstream portion x'[0:23]. This arithmetic sum necessarily inserts a "0" at the appropriate position, namely the rightmost "1" in the masked bitstream from process 58, as a "1" is also present in the bitstream x' thereat (given that it completes the HDLC trigger sequence of five consecutive "1" bits). The natural propagation of the carry leftward from this position simply shifts the remaining bits of the bitstream one position to the left.

For the above-noted example, process 62 operates as follows:

x'[0:23]=1001 1111 1010 0111 1110 1010 x'[0:23]·MASK(1)=1001 1111 0000 0000 0000 0000 z=1 0011 1110 1010 0111 1110 1010

In this example, bitstream z now has twenty-five bits, namely the original twenty-four bits of bitstream portion x'[0:23] with a "0" inserted after the first (leftmost) sequence of five "1" bits.

Following process 62, DSP 20 next performs decision 63 to determine whether more bit insertions remain for the current bitstream portions retrieved in process 52. If so (decision 63 is YES), additional bit insertions remain to be processed. In this case, the bitstream portion x' to be processed through processes 56, 58, 62 is set, in process 64, to the current state of output bitstream z generated by the last iteration through process 62. In process 66, DSP 20 is instructed to select the bit pattern for the next bit insertion location generated in process 54. Control then passes to process 56, for insertion of the next bit into the next indicated location.

For passes through processes 56, 58, 62 after the first insertion, bitstream x' will have more bits than the bit patterns, masks, etc. Adjustment of these patterns will therefore be required, as will be now described relative to the above-noted example.

For the second pass through process 56, bitstream x' now has twenty-five bits, and corresponds to the sequence 1 0011

1110 1010 0111 1110 1010. In the generation of the mask for the second insertion bit position y[17] in this example, therefore, process 56 generates at least a twenty-five bit mask, with all "1" bits from the leftmost position until the corresponding bit position [17]. Alternatively, processes 56, 58, 62 may simply be performed using thirty-two bit data words, in which leading bits for the bitstream x' are set to zero, but with leading bits of the mask used in process 58 being "1". In either case, the second pass through process 56 generates the following mask MASK(2):

MASK(2)=1 1111 1111 1111 1111 1100 0000 having all "1" bits until the bit position corresponding to bit position [17] of insertion bitstream y (maintaining bit position [23] as the LSB). Process 58 is then performed to execute the logical AND of MASK(2) with the current bitstream x'[−1:23] (bit position (−1) comprehending the insertion of the "0" in the first pass) as follows:

x'[−1:23]=1 0011 1110 1010 0111 1110 1010
MASK(2)=1 1111 1111 1111 1111 1100 0000
x'[−1:23]·MASK(2)=1 0011 1110 1010 0111 1100 0000

In process 62, the next iteration of output bitstream z is generated by the arithmetic sum of the result of the logical AND process 58 with the current state of bitstream x'[−1:23], as follows:

x'[−1:23]=1 0011 1110 1010 0111 1110 1010
x'[−1:23]·MASK(2)=1 0011 1110 1010 0111 1100 0000
z=10 0111 1101 0100 1111 1010 1010

Output bitstream z now has twenty-six bits, including the original bitstream x[0:23] with two "0" bits inserted after the sequences of five "1" bits therein.

Decision 63 is then again performed, to determine if additional bit insertions remain to be processed. If not (decision 63 is NO), the current state of output bitstream z is then forwarded to process 31, referring again to FIG. 4.

Figure 1:
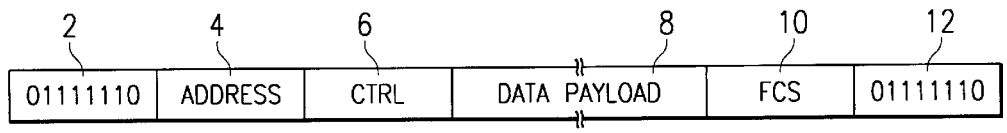
FIG. 1 is a representation of a conventional HDLC data frame.
Figure 2:
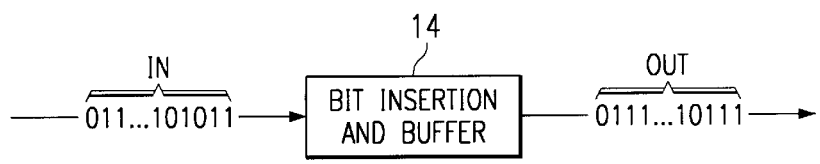
FIG. 2 is an electrical diagram, in block form, illustrating the operation of one class of conventional bit insertion circuitry.

In the exemplary communication process illustrated in FIG. 4, frame formatting process 31 is performed by DSP 20 to arrange the message data and CRC checksum information corresponding thereto, such data now including the inserted bits as performed by bit insertion process 30, to include the appropriate overhead information. In this regard, as is conventionally performed for the particular protocol, and with reference to FIG. 1, the message data are gathered into data portion 8 and FCS portion 10 according to the particular packet size; additionally, process 31 adds thereto the opening and closing flags 2, 12, destination address portion 4, and control information 6 are added.

In process 32, DSP 20 then effects such processing as required for the particular modulation scheme to be used by transceiver 22 to transmit the signals over facility TWP. Such modulation schemes of course vary according to the desired communications technique, and may include such modulation as QAM, CMT, or the like. Transceiver 22 then converts the digital information into the corresponding analog signals, and drives facility TWP appropriately.

It will be appreciated that the receipt of the message packets processed according to the preferred embodiment of the invention, including the deletion of those bits that were inserted in bit insertion process 30 according to the preferred embodiment of the invention, may be carried out according to conventional methods. In this regard, such conventional bit deletion processes merely examine data payload portion 8 of the received packets, and delete each zero following a sequence of five ones. The original bitstream x will thus be recovered, in a form ready for subsequent processing as desired.

The present invention therefore provides numerous advantages in the communication of digital data. In particular, the process for detecting trigger sequences after which bits are to be inserted is made independent from the bit insertion process itself, according to the present invention. This separation of these two functions permits trigger sequence detection and bit insertion to be performed effectively in parallel. Further, this separation, along with the synchronization of the bit insertion sequence with the data bitstream itself, ensures that the data rate exiting the bit insertion process can remain effectively constant. The processing rate of the bit insertion process is thus not dependent upon the values of the data bitstream itself, and is in this sense deterministic and dependent upon the construction and clock rate of the circuitry carrying out the functions. Furthermore, the present invention may be readily implemented in connection with a wide range of protocols, having differing trigger sequences requiring bit insertion.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A bit insertion method for serial data transmission, comprising the steps of:

receiving an input data bitstream to be transmitted over a communications facility;

montoring the received input data bitstream to detect a trigger sequence of bit values;

generating an insertion bitstream responsive to the monitoring step, the insertion bitstream comprising a sequence of bits each bit of the insertion bitstream associated with a bit of the input data bitstream and having a value indicating whether a bit is to be inserted adjacent to its associated bit of the input data bitstream; and generating an output bitstream from the input data bitstream and the insertion bitstream corresponding to the input data bitstream with selected bit values inserted at locations indicated by the values of the associated insertion bitstream.

2. The method of claim 1, wherein the monitoring step comprises:

retrieving a sequence of bits of the input data bitstream including a current bit corresponding to a current bit position in the input data bitstream and a selected number of bit corresponding to a selected number of previous bit positions beginning with the bit position previous in time to the current bit position and extending to an $n^{th}$ previous bit position;

retrieving an $n^{th}$ previous bit of the insertion bitstream associated with the $n^{th}$ previous bit position of the input data; bitstream and combining the retrieved sequence of bits of the input data bitstream and the $n^{th}$ previous bit of the insertion bitstream in a manner according to the trigger sequence to generate an insertion output value indicating whether the retrieved sequence of bits matches the trigger sequence.

3. The method of claim 2, wherein the monitoring step further comprises:

advancing the current bit position of the data bitstream to a next bit position; and repeating the retrieving, combining and advancing steps.

4. The method of claim 3, wherein the generating step comprises:

responsive to each instance of the combining step, generating a current bit value of the insertion bitstream corresponding to the insertion output value, and associated with the current bit position of the data bitstream.

5. The method of claim 2, wherein the combining step comprises:

applying a digital filter function to the retrieved sequence of bits of the input data bitstream and the $n^{th}$ previous bit of the insertion bitstream, the digital filter function having coefficients corresponding to the trigger sequence.

6. The method of claim 1, wherein the step of generating the output bitstream is performed on a first sequence of bits of the input data bitstream during the monitoring step being performed on a second sequence of bits of the input data bitstream, the second sequence of bits being later in time than the first sequence of bits.

7. The method of claim 1, wherein the step of generating the output bitstream comprises:

retrieving a block of bits of the input data bitstream after the monitoring step has been applied thereto;

retrieving a block of bits of the insertion bitstream associated with the retrieved block of bits of the input data bitstream;

for each set bit of the retrieved block of bits of the insertion bitstream having a value indicating that a bit is to be inserted, performing a sequence of steps comprising:

generating amask pattern for the corresponding set bit;

logically ANDing the mask pattern with a current modified input data bitstream block corresponding to a copy of the retrieved block of bits of the input data bitstream modified to include any previously inserted bits to produce a masked input data bitstream block; and generating a next instance of the modified input data bitstream from the arithmetic sum of the masked input data bitstream block and the current modified input data bitstream block; and generating a block of the output bitstream corresponding to the modified input data bitstream block after the generating, logically ANDing, and generating steps have been performed for the last set bit of the retrieved block of bits of the insertion bitstream.

8. The method of claim 1, further comprising:

after the step of generating the output bitstream, generating a packet frame comprising a sequence of a beginning flag, followed by a portion of the output bitstream, followed by an ending flag.

9. The method of claim 8, wherein the ending flag corresponds to a bit sequence including the trigger sequence.

10. The method of claim 9, wherein the beginning flag corresponds to a bit sequence including the trigger sequence.

11. A data communications system, comprising:

a host computer;

a transceiver, coupled to a communications facility; and a digital signal processing device, coupled to the host computer and to the transceiver, programmed to perform a sequence of operations comprising:

receiving an input data bitstream generated by the host computer, to be transmitted by the transceiver over the communications facility;

monitoring the received input data bitstream to detect a trigger sequence of bit values;

generating an insertion bitstream responsive to the monitoring step, the insertion bitstream comprising a sequence of bits, each bit of the insertion bitstream associated with a bit of the input data bitstream and having a value indicating whether a bit is to be inserted adjacent to its associated bit of the input data bitstream;

generating an output bitstream from the input data bitstream and the insertion bitstream corresponding to the input data bitstream with selected bit values inserted at locations indicated by the values of the associated insertion bitstream;

forwarding, to the transceiver, frame packet data comprising the output bitstream.

12. The system of claim 11, wherein the digital signal processing device is programmed to perform the monitoring step by performing the operations of:

retrieving a sequence of bits of the input data bitstream including a current bit corresponding to a current bit position in the input data bitstream and a selected number of bits corresponding to a selected number of previous bit positions beginning with the bit position previous in time to the current bit position and extending to an $n^{th}$ previous bit position;

retrieving an $n^{th}$ previous bit of the insertion bitstream associated with the $n^{th}$ previous bit of the insertion bitstream in a manner according to the trigger sequence to generate an insertion output value indicating whether the retrieved sequence of bits matches the trigger sequence;

advancing the current bit position of the input data bitstream to a next bit position; and repeating the retrieving, combining an advancing steps;

and wherein the digital signal processing device is programmed to perform the generating operation by:

responsive to each instance of the combining step, generating a current bit value of the insertion bitstream corresponding to the insertion output value, and associated with the current bit position of the input data bitstream.

13. The system of claim 12, wherein the digital signal processing device is programmed to perform the combining operation by:

applying a digital filter function to the retrieved sequence of bits of the input data bitstream and the $n^{th}$ previous bit of the insertion bitstream, the digital filter function having coefficients corresponding to the trigger sequence.

14. The system of claim 11, wherein the digital signal processing device is programmed to perform the operation of generating the output bitstream on a first sequence of bits of the input data bitstream during the performing of the monitoring operation on a second sequence of bits of the input data bitstream, the second sequence of bits being later in time than the first sequence of bits.

15. The system of claim 11, wherein the digital signal processing device is programmed to perform the operation of generating the output bitstream by a sequence of operations comprising:

retrieving a block of bits of the input data bitstream after the monitoring step has been applied thereto;

retrieving a block of bits of the insertion bitstream associated with the retrieved block of bits of the input data bitstream;

for each set bit of the retrieved block of bits of the insertion bitstream having a value indicating that a bit is to be inserted, performing a sequence of steps comprising:

generating a mask pattern for the corresponding set bit;

logically ANDing the mask pattern with a current modified input data bitstream block corresponding to a copy of the retrieved block of bits of the input data bitstream modified to include any previously inserted bits to produce a masked input data bitstream block; and generating a next instance of the modified input data bitstream from the arithmetic sum of the masked input data bitstream block and the current modified input data bitstream block; and generating a block of the output bitstream corresponding to the modified input data bitstream block after the generating, logically ANDing, and generating steps have been performed for the last set bit of the retrieved block of bits of the insertion bitstream.

16. The system of claim 11, wherein the digital signal processing devices is further programmed to perform, after the operation of generating the output bitstream, generating a packet frame comprising a sequence of a beginning flag, followed by a portion of the output bitstream, followed by an ending flag that corresponds to a bit sequence including the trigger sequence.

17. The system of claim 11, wherein the digital signal processing device comprises a digital signal processor integrated circuit.

18. The system of claim 11, wherein the digital signal processing device is further programmed to perform the operation of applying error correction coding to data received from the host computer, prior to the monitoring operation.

* * * * *